(12) United States Patent
Xu et al.

(10) Patent No.: US 12,476,543 B2
(45) Date of Patent: Nov. 18, 2025

(54) DC CONVERTER AND A CONTROL METHOD OF A PWM CONTROLLER

(71) Applicant: HEFEI CLT MICROELECTRONICS CO. LTD, Anhui (CN)

(72) Inventors: Weiwei Xu, Anhui (CN); Ji Jin, Anhui (CN)

(73) Assignee: HEFEI CLT MICROELECTRONICS CO. LTD, Anhui (CN)

( * ) Notice: Subject to any disclaimer, the term of this patent is extended or adjusted under 35 U.S.C. 154(b) by 0 days.

(21) Appl. No.: 18/804,187

(22) Filed: Aug. 14, 2024

(65) Prior Publication Data

US 2024/0413752 A1      Dec. 12, 2024

Related U.S. Application Data

(63) Continuation of application No. PCT/CN2024/075475, filed on Feb. 2, 2024.

(30) Foreign Application Priority Data

May 23, 2023   (CN) .......................... 202310584586.X

(51) Int. Cl.
*H02M 3/158*       (2006.01)
*H02M 3/157*       (2006.01)

(52) U.S. Cl.
CPC ......... *H02M 3/1584* (2013.01); *H02M 3/157* (2013.01); *H02M 3/158* (2013.01)

(58) Field of Classification Search
CPC ..... H02M 3/158; H02M 3/157; H02M 3/1584
See application file for complete search history.

(56) References Cited

U.S. PATENT DOCUMENTS 6,166,527 A * 12/2000 Dwelley ............. H02M 3/1582
                                                     323/283
7,733,070 B2 * 6/2010 Kumagai ............ H02M 3/1584
                                                     206/285
(Continued)

FOREIGN PATENT DOCUMENTS

CN      101741261 A      6/2010
CN      104158399 A      11/2014
(Continued)

OTHER PUBLICATIONS

International Search Report for corresponding International Patent Application No. PCT/CN2024/075475, mailed Apr. 18, 2024, 3 pages.

*Primary Examiner* — Yusef A Ahmed
(74) *Attorney, Agent, or Firm* — Cooper Legal Group, LLC

(57) ABSTRACT

The present application discloses a DC converter and a control method of a PWM controller, including a PWM controller. The PWM controller alternately outputs two state signals, a first state signal is configured to control a first switch SW1 and a second switch SW2 to turn on; a second state signal is configured to control a third switch SW3 and a fourth switch SW4 to turn on. The PWM controller is configured to output a fourth state signal for controlling the first switch SW1 and the third switch SW3 to turn off when it is determined that the first terminal voltage VOP of the positive voltage output capacitor COP is greater than the first target voltage VM1, the PWM controller.

3 Claims, 9 Drawing Sheets

(56) References Cited

U.S. PATENT DOCUMENTS

| | | | |
|---|---|---|---|
| 10,014,778 B1* | 7/2018 | Wei | H02M 3/1582 |
| 10,291,126 B1* | 5/2019 | Wei | H02M 3/158 |
| 11,290,006 B2* | 3/2022 | Ozanoglu | H02M 3/04 |
| 12,287,689 B2* | 4/2025 | Chen | G06F 1/3203 |
| 2005/0088160 A1* | 4/2005 | Tanaka | H02M 3/158 |
| | | | 323/284 |
| 2006/0214648 A1* | 9/2006 | Liu | H02M 3/157 |
| | | | 323/222 |
| 2008/0055946 A1* | 3/2008 | Lesso | H02M 3/1582 |
| | | | 363/63 |
| 2008/0315850 A1* | 12/2008 | Nishida | H02M 3/157 |
| | | | 323/284 |
| 2009/0108820 A1* | 4/2009 | Mirea | H02M 3/156 |
| | | | 323/271 |
| 2010/0231189 A1* | 9/2010 | Chen | H02M 3/1582 |
| | | | 323/284 |
| 2010/0283442 A1 | 11/2010 | Nakashima | |
| 2011/0068757 A1* | 3/2011 | Xu | H02M 3/158 |
| | | | 323/271 |
| 2012/0062030 A1* | 3/2012 | Xu | H02M 3/1582 |
| | | | 307/31 |
| 2012/0274295 A1* | 11/2012 | Lin | H02M 3/1582 |
| | | | 323/282 |
| 2014/0232359 A1* | 8/2014 | Dash | H02M 3/158 |
| | | | 323/235 |
| 2015/0236588 A1* | 8/2015 | Branca | H02M 3/158 |
| | | | 323/271 |
| 2015/0236594 A1* | 8/2015 | Branca | G09G 5/18 |
| | | | 345/82 |
| 2015/0303803 A1* | 10/2015 | Chen | H02M 3/158 |
| | | | 323/271 |
| 2017/0005577 A1* | 1/2017 | Chen | H02M 3/1582 |
| 2017/0040898 A1* | 2/2017 | Hong | H02M 3/1582 |
| 2017/0207703 A1 | 7/2017 | Houston et al. | |
| 2018/0337603 A1* | 11/2018 | Houston | H02M 3/1582 |
| 2021/0050790 A1* | 2/2021 | Talari | H02M 1/32 |
| 2024/0039403 A1* | 2/2024 | Ahn | H02M 3/07 |
| 2024/0333155 A1* | 10/2024 | Yang | H02M 3/1582 |
| 2024/0380323 A1* | 11/2024 | Park | H02M 3/158 |

FOREIGN PATENT DOCUMENTS

| | | |
|---|---|---|
| CN | 111049401 A | 4/2020 |
| CN | 116317584 A | 6/2023 |

\* cited by examiner when it is determined that a first terminal voltage VOP of a positive voltage output capacitor COP is equal to a first target voltage VM1 and a positive voltage output current IOP is equal to a negative voltage output current ION, a PWM controller alternately outputs a first state signal and a second state signal every preset cycle, the first state signal is configured to control a first switch SW1 and a second switch SW2 to turn on synchronously, and control a third switch SW3 and a fourth switch SW4 to turn off synchronously; the second state signal is configured to control the first switch SW1 and the second switch SW2 to turn off synchronously, and control the third switch SW3 and the fourth switch SW4 to turn on synchronously; wherein, the first target voltage VM1 is achievable as a working voltage for the positive voltage output capacitor COP — S61 when it is determined that the first terminal voltage VOP of the positive voltage output capacitor COP is less than the first target voltage VM1, or the positive voltage output current IOP is greater than the negative voltage output current ION, the PWM controller outputs a third state signal for controlling the first switch SW1 and the third switch SW3 to turn on, and controlling the second switch SW2 and the fourth switch SW4 to turn off — S62 when it is determined that the first terminal voltage VOP of the positive voltage output capacitor COP is greater than the first target voltage VM1, or the positive voltage output current IOP is less than the negative voltage output current ION, the PWM controller outputs a fourth state signal for controlling the first switch SW1 and the third switch SW3 to turn off, and controlling the second switch SW2 and the fourth switch SW4 to turn on — S63

FIG. 6

DC CONVERTER AND A CONTROL METHOD OF A PWM CONTROLLER

CROSS-REFERENCE TO RELATED APPLICATION

This application is a continuation of PCT application serial no. PCT/CN2024/075475, filed on Feb. 2, 2024, which claims the priority and benefit of Chinese patent application serial no. 202310584586.X, filed on May 23, 2023. The entireties of PCT application serial no. PCT/CN2024/075475 and Chinese patent application serial no. 202310584586.X are hereby incorporated by reference herein and made a part of this specification.

TECHNICAL FIELD

The present application relates to a technical field of a direct current (DC) supply power circuit, and in particular, relates to a DC converter and a control method of a pulse width modulation (PWM) controller.

BACKGROUND ART

Active-matrix organic light-emitting diode (AMOLED) screens often adopt a single inductor L-bipolar output direct-current-to-direct-current (DC-DC) converter as a power supply, a traditional single inductor L-bipolar output step-down/step-up DC-DC converter, has a positive output end that can only be higher than an input voltage, but a positive power supply voltage required for AMOLED display screens on wristbands and smartwatches currently in use is approximately around 3.3V, and a voltage of a commonly used lithium battery is between 2.8-4.5V, so this requires the positive output end to have a same step-down/step-up ability as a negative output end. The patent with publication number US20150236594A1 discloses a circuit diagram of the single inductor L-bipolar output step-down/step-up DC-DC converter, referring to FIG. 1.

Referring to FIG. 1, the single inductor L-bipolar output DC-DC converter has three working states, that is, ΦC, ΦP and ΦN respectively. The inductor L accumulates energy in a state of ΦC. When in the state of ΦC, the energy on the inductor L is allocated to a positive voltage output VOP and a negative voltage output VON, respectively. In the state of ΦC, a switch SW1 and a switch SW2 are turned on, a switch SW3 and a switch SW4 are turned off, and an end of the inductor L is connected to an input voltage VIN and another end is grounded. Meanwhile, a voltage difference between two ends of the inductor L is positive, the inductor L is magnetized, and a current of the inductor L increases, at the same time, a positive voltage output capacitor COP is discharged through a load current IOP, and a load current ION charges a negative pressure output capacitor. When in a state of ΦP, the switch SW1 and the switch SW3 are turned on, the switch SW2 and the switch SW4 are turned off, and the end of the inductor L is connected to the input voltage VIN and the other end is connected to the positive voltage output VOP. Meanwhile, the voltage difference between the two ends of the inductor L is negative, and the inductor L is demagnetized, the current of the inductor L decreases, and at the same time, the current of the inductor L charges the positive voltage output capacitor COP. When in a state of ΦN, the switch SW2 and the switch SW4 are turned on, the switch SW1 and the switch SW3 are turned off, and the end of the inductor L is connected to the negative voltage output VON and the other end is grounded. Meanwhile, the voltage difference between the two ends of the inductor L is negative, and the inductor L is demagnetized, and the current of the inductor L decreases, and at the same time, the negative pressure output capacitor discharges through the current of the inductor L.

A current signal VSEN sampled by a current sampling circuit 3 is added to a slope compensation circuit 5 through an adder 4 to obtain a signal VSUM. The positive voltage output VOP and the negative voltage output VON are divided by a voltage divider resistor to obtain a positive feedback voltage VFBP and a negative feedback voltage VFBN, respectively, an error between VFBP and positive reference voltage VREFP is amplified into VEAP through an amplifier 6, and an error between VFBN and negative reference voltage VFBN is amplified into VEAN through an amplifier 7. Error signals VEAP and VEAN obtain VEAPN through an adder 8.

Referring to FIG. 1, the converter adopts peak current mode PWM control. FIG. 2 shows a specific control logic relationship: a signal obtained by comparing a VEAPN signal with a VSUM signal is controlled by a PWM logic circuit to control a time of ΦC state, thereby determining an amount of energy accumulated by the inductor L, a signal obtained by comparing VEAP, VEAN signals, and VSUM signal is controlled by the PWM logic circuit to control times of ΦP state and ΦN state, respectively, in order to allocate energy and modulate positive and negative voltage outputs.

A problem with the conventional control method lies in that, when the negative voltage output |VON| decreases and approaches 0, the circuit gradually degrades to two states, ΦC and ΦP, which becomes a step-up DC-DC converter, which means that the positive voltage output VOP cannot be lower than a power supply voltage, resulting in a smaller output range of the positive output voltage.

SUMMARY

In order to increase an output range of a positive output voltage in a DC converter, the present application provides a DC converter and a control method of a PWM controller.

In a first aspect, the present application provides a DC converter that adopts the following technical solution:

a DC converter, including a DC conversion circuit and a PWM controller, wherein the DC conversion circuit includes a first switch SW1, a second switch SW2, a third switch SW3 and a fourth switch SW4, and further includes an inductor L, a positive voltage output capacitor COP and a negative voltage output capacitor CON, a first end of the first switch SW1 is connected to an input voltage, a second end of the first switch SW1 is connected to a first end of the inductor L, a second end of the inductor L is connected to a first end of the third switch SW3, a second end of the third switch SW3 is connected to a first end of the positive voltage output capacitor COP, a second end of the positive voltage output capacitor COP is connected to a first end of the negative voltage output capacitor CON, the first end of the negative voltage output capacitor CON is connected to the first end of the inductor L through the fourth switch SW4, the second end of the positive voltage output capacitor COP and the first end of the negative voltage output capacitor CON are grounded together; a second end of the second switch SW2 is grounded, a first end of the second switch SW2 is connected to the second end of the inductor L; a load is connected between the first end of the positive voltage output capacitor COP and a second end of the negative voltage output capacitor CON; further including:

the PWM controller is configured to alternately output a first state signal and a second state signal every preset cycle when it is determined that a first terminal voltage VOP of the positive voltage output capacitor COP is equal to a first target voltage VM1 and a positive voltage output current IOP is equal to a negative voltage output current ION, wherein the first state signal is configured to control the first switch SW1 and the second switch SW2 to turn on synchronously, and control the third switch SW3 and the fourth switch SW4 to turn off synchronously; the second state signal is configured to control the first switch SW1 and the second switch SW2 to turn off synchronously, and control the third switch SW3 and the fourth switch SW4 to turn on synchronously; and the first target voltage VM1 is a working voltage too be reached by the positive voltage output capacitor COP;

the PWM controller is further configured to output a third state signal for controlling the first switch SW1 and the third switch SW3 to turn on, and controlling the second switch SW2 and the fourth switch SW4 to turn off when it is determined that the first terminal voltage VOP of the positive voltage output capacitor COP is less than the first target voltage VM1 or the positive voltage output current IOP is greater than the negative voltage output current ION;

the PWM controller is further configured to output a fourth state signal for controlling the first switch SW1 and the third switch SW3 to turn off and controlling the second switch SW2 and the fourth switch SW4 to turn on when it is determined that the first terminal voltage VOP of the positive voltage output capacitor COP is greater than the first target voltage VM1 or the positive voltage output current IOP is less than the negative voltage output current ION.

By adopting the above technical solution, when outputting the first and second state signals, volt second balance is performed on the inductor L, and $D(VIN-0)=(1-D)(VOP-VON)$, $(VOP-VON)/VIN=D/(1-D)$; can be obtained; wherein, VIN is the input voltage, VOP is the positive output voltage, VON is the negative output voltage, D is a proportion of working time of Φ1 within one cycle, $D \in (0,1)$, $(VOP-VON)/VIN \in (0, \infty)$, therefore, theoretically, the positive output voltage VOP and VON can both be any positive voltage and any negative voltage, which means that the output range of the positive output voltage VOP is improved compared to only being greater than the input voltage.

In a possible embodiment, the DC converter further includes a driving circuit;

wherein an output end of the PWM controller is connected to an input end of the driving circuit, which can receive a D1 pulse signal and a D2 pulse signal output by the PWM controller;

wherein the driving circuit receives the D1 pulse signal to output S1 signal or S4 signal, the driving circuit receives the D2 pulse signal to output S2 signal or S3 signal, wherein the S1 signal is configured to control the first switch SW1 to turn on, the S4 signal is configured to control the fourth switch SW4 to turn on, wherein the S2 signal is configured to control the second switch SW2 to turn on, and the S3 signal is configured to control the third switch SW3 to turn on;

wherein when the D1 pulse signal is at a high level, the driving circuit outputs the S1 signal, when the D1 pulse signal is at a low level, the driving circuit outputs the S4 signal; when the D2 pulse signal is at the high level, the driving circuit outputs the S2 signal, when the D2 pulse signal is at the low level, the driving circuit outputs the S3 signal;

the first state signal is a continuous and equal high-level D1 pulse signal and high-level D2 pulse signal, the second state signal is a continuous and equal low-level D1 pulse signal and continuous low-level D2 pulse signal, the third state signal is a continuous high-level D1 pulse signal and low-level D2 pulse signal, and the fourth state signal is a continuous low-level D1 pulse signal and high-level D2 pulse signal.

In the possible embodiment, a first positive voltage divider resistor RFP1 and a second positive voltage divider resistor RFP2 are connected in series between the first end and second end of the positive voltage output capacitor COP, a first end of the first positive voltage divider resistor RFP1 is connected to the first end of the positive voltage output capacitor COP, and a second end of the second positive voltage divider resistor RFP2 is connected to the second end of the positive voltage output capacitor COP, a second end of the first positive voltage divider resistor RFP1 is connected to a first end of the positive voltage divider resistor RFP2; a first negative voltage divider resistor RFN1 and a second negative voltage divider resistor RFN2 are connected in series between the first end and second end of the negative voltage output capacitor CON, a first end of the first negative voltage divider resistor RFN1 is connected to the first end of the negative voltage output capacitor CON, a second end of the second negative voltage divider resistor RFN2 is connected to the second end of the negative voltage output capacitor CON, and a second end of the first negative voltage divider resistor RFN1 is connected to a first end of the second negative voltage divider resistor RFN2;

the DC converter further includes a positive sampling circuit, a negative sampling circuit, and an intermediate sampling circuit;

the positive sampling circuit is configured to collect a second terminal voltage VFBP of the first positive voltage divider resistor RFP1;

the negative sampling circuit is configured to collect the second terminal voltage of the first negative voltage divider resistor RFN1 and convert the second terminal voltage into a positive voltage to obtain a voltage VFBN;

the intermediate sampling circuit is configured to collect a current at the first end of the second switch SW2 and convert the current into a VSEN voltage signal;

the DC converter further includes a clock circuit, the clock circuit is configured to generate a CLK clock signal and input the CLK clock signal to an input end of the PWM controller, the PWM controller outputs continuous and identical D1 pulse signal and D2 pulse signal based on the CLK clock signal, wherein pulse widths of the D1 pulse signal and D2 pulse signal are preset periods.

In the possible embodiment, the DC converter further includes a first amplification module and a second amplification module;

wherein the first amplification module adds an error between the second terminal voltage VFBP of the first positive voltage divider resistor RFP1 and a first reference voltage VREFP to an error between the voltage VFBN and a second reference voltage VREFN, and outputs a sum in a gain manner to obtain a first sampling voltage VEA1, wherein VFBP=RFP2*VM1/

(RFP1+RFP2), a second target voltage VM2 is a target voltage at the second end of the negative voltage output capacitor CON, VREFN=RFN2*VM2/(RFN1+RFN2), VEA1=A1 (VFBP VREFP)+A1 (VFBN VREFN), where A1 is a gain of the first amplification module;

after adding the first sampling voltage VEA1 to a VSEN voltage obtained from the intermediate sampling circuit, a sum is input into the input end of the PWM controller to control the PWM controller to output a continuous D1 pulse signal;

the second amplification module subtracts the error between the second terminal voltage VFBP of the first positive voltage divider resistor RFP1 and the first reference voltage VREFP by the error between the voltage VFBN and the second reference voltage VREFN, and outputs a difference in a gain manner to obtain a second sampling voltage VEA2, and the second sampling voltage VEA2 is A2(VFBP-VREFP)-A2(VFBN-VREFN), where A2 is a gain of the second amplification module;

the second sampling voltage VEA2 is input to the input end of the PWM controller to control an output of the D2 pulse signal by PWM controller, and when the second sampling voltage VEA2 is greater than a corresponding stable voltage, the PWM controller outputs the D2 pulse signal with the pulse width greater than the D1 pulse signal, when the second sampling voltage VEA2 is less than the corresponding stable voltage, the PWM controller outputs the D2 pulse signal with the pulse width less than the D1 pulse signal, when the VEA2 is equal to the corresponding stable voltage, the PWM controller outputs the D1 pulse signal and the D2 pulse signal with an equal pulse width, when the first terminal voltage VOP of the positive voltage output capacitor COP is equal to the first target voltage VM1, the second sampling voltage VEA2 is equal to the corresponding stable voltage.

In a second aspect, the present application provides a control method of the PWM controller that adopts the following technical solution:

the control method of the PWM controller applicable to the DC converter in the first aspect, including:

when it is determined that a first terminal voltage VOP of a positive voltage output capacitor COP is equal to a first target voltage VM1 and a positive voltage output current IOP is equal to a negative voltage output current ION, a PWM controller alternately outputs a first state signal and a second state signal every preset cycle, the first state signal is configured to control a first switch SW1 and a second switch SW2 to turn on synchronously, and control a third switch SW3 and a fourth switch SW4 to turn off synchronously; the second state signal is configured to control the first switch SW1 and the second switch SW2 to turn off synchronously, and control the third switch SW3 and the fourth switch SW4 to turn on synchronously; wherein, the first target voltage VM1 is achievable as a working voltage for the positive voltage output capacitor COP;

when it is determined that the first terminal voltage VOP of the positive voltage output capacitor COP is less than the first target voltage VM1, or the positive voltage output current IOP is greater than the negative voltage output current ION, the PWM controller outputs a third state signal for controlling the first switch SW1 and the third switch SW3 to turn on, and controlling the second switch SW2 and the fourth switch SW4 to turn off; and when it is determined that the first terminal voltage VOP of the positive voltage output capacitor COP is greater than the first target voltage VM1, or the positive voltage output current IOP is less than the negative voltage output current ION, the PWM controller outputs a fourth state signal for controlling the first switch SW1 and the third switch SW3 to turn off, and controlling the second switch SW2 and the fourth switch SW4 to turn on.

In summary, the present application can achieve at least one of the following beneficial technical effects:

1. when outputting the first and second state signals, volt second balance is performed on the inductor L, and $D(VIN-0)=(1-D)(VOP-VON)$, $(VOP-VON)/VIN=D/(1-D)$; can be obtained; wherein, VIN is the input voltage, VOP is the positive output voltage, VON is the negative output voltage, D is the proportion of working time of $\Phi 1$ within one cycle, $D\in(0,1)$, $(VOP-VON)/VIN\in(0, \infty)$, therefore, theoretically, the positive output voltage VOP and VON can both be any positive voltage and any negative voltage, which means that the output range of the positive output voltage VOP is improved compared to only being greater than the input voltage.

BRIEF DESCRIPTION OF THE DRAWINGS

FIG. 6 is a flowchart of a control method of the PMW controller in an embodiment of the present application;

DETAILED DESCRIPTION

The present application will be further described in detail below with reference to FIGS. 1-9.

Those skilled in the art can make non-creative modifications to this embodiment as needed after reading the description, but as long as they are within the scope of the claims in the present application, they are protected by patent law.

In order to clarify the purpose, technical solution, and advantages of the embodiment in the present application, the following will provide a clear and complete description of the technical solution in an embodiment of the present application in conjunction with the accompanying drawings, obviously, a described embodiment is a part of the embodiment of the present application, not an entire embodiment. Based on the embodiments in the present application, all other embodiments obtained by those skilled in the art without creative labor are within the scope of protection of the present application.

In addition, the term "and/or" in this article is only a description of an association relationship between related objects, indicating that there can be three types of relationships, for example, A and/or B can indicate A alone, A and B together, or B alone. In addition, the character "/" in this article, unless otherwise specified, generally indicates that the related objects are an "or" relationship.

Figure 1:
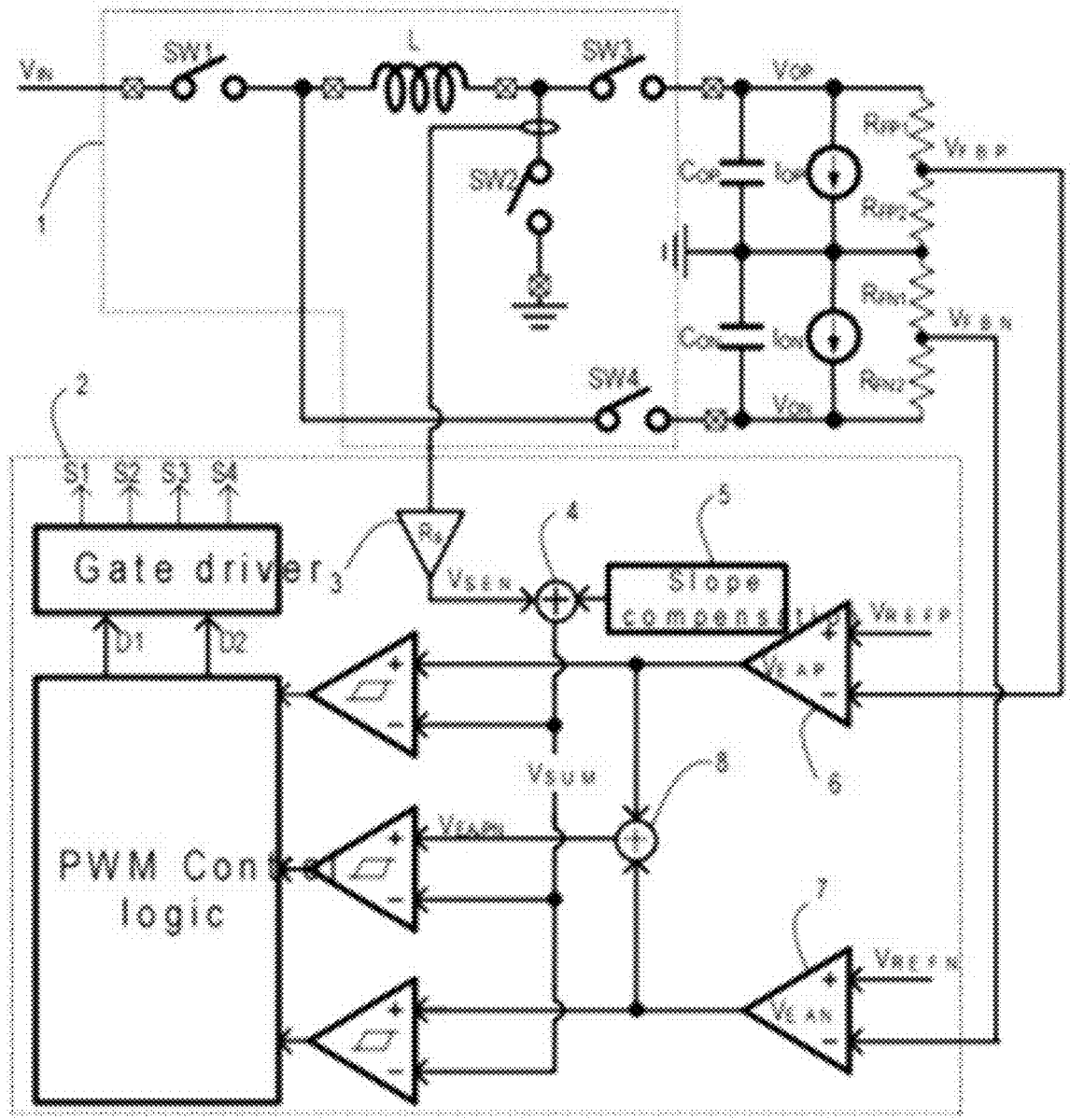
FIG. 1 is a circuit schematic structure diagram of a DC converter of a related technology in the background art.
Figure 2:
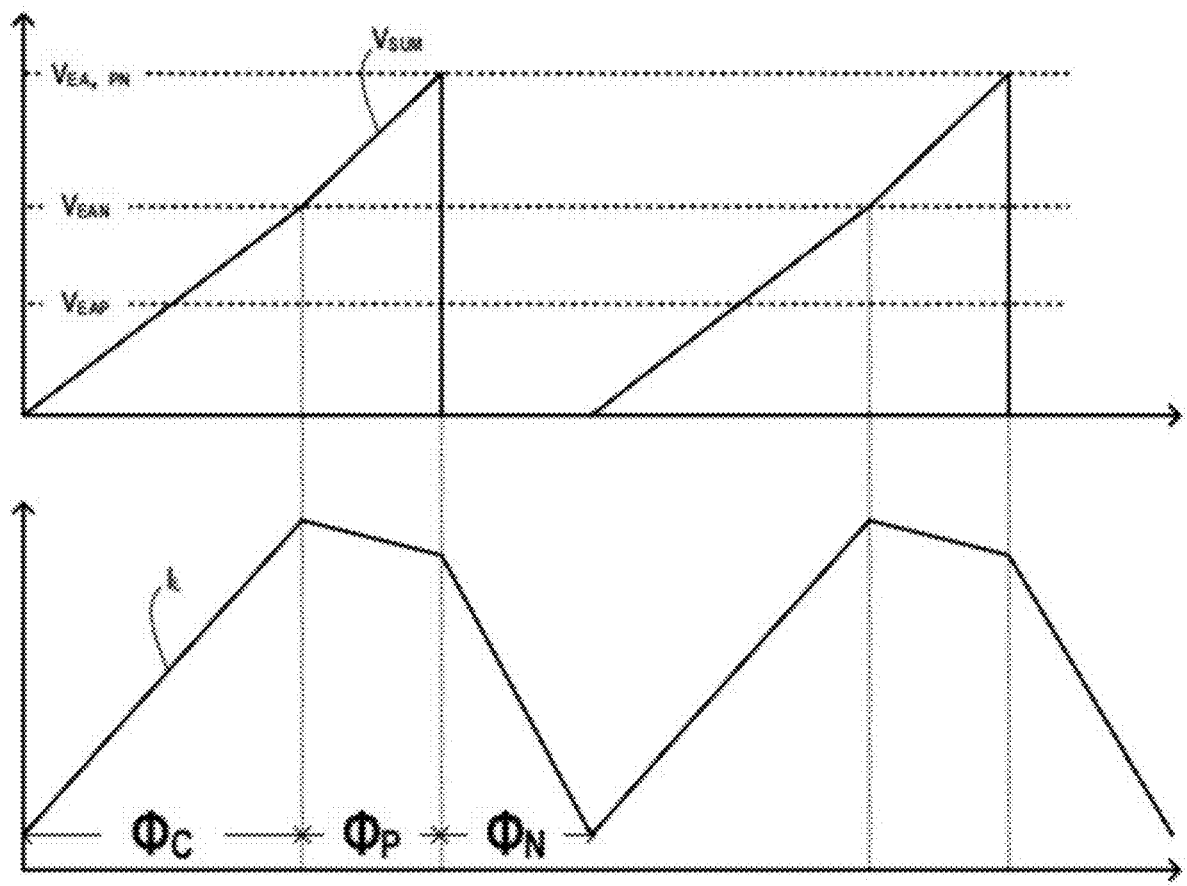
FIG. 2 is a timing diagram of voltage and current in various working states in the background art.
Figure 3:
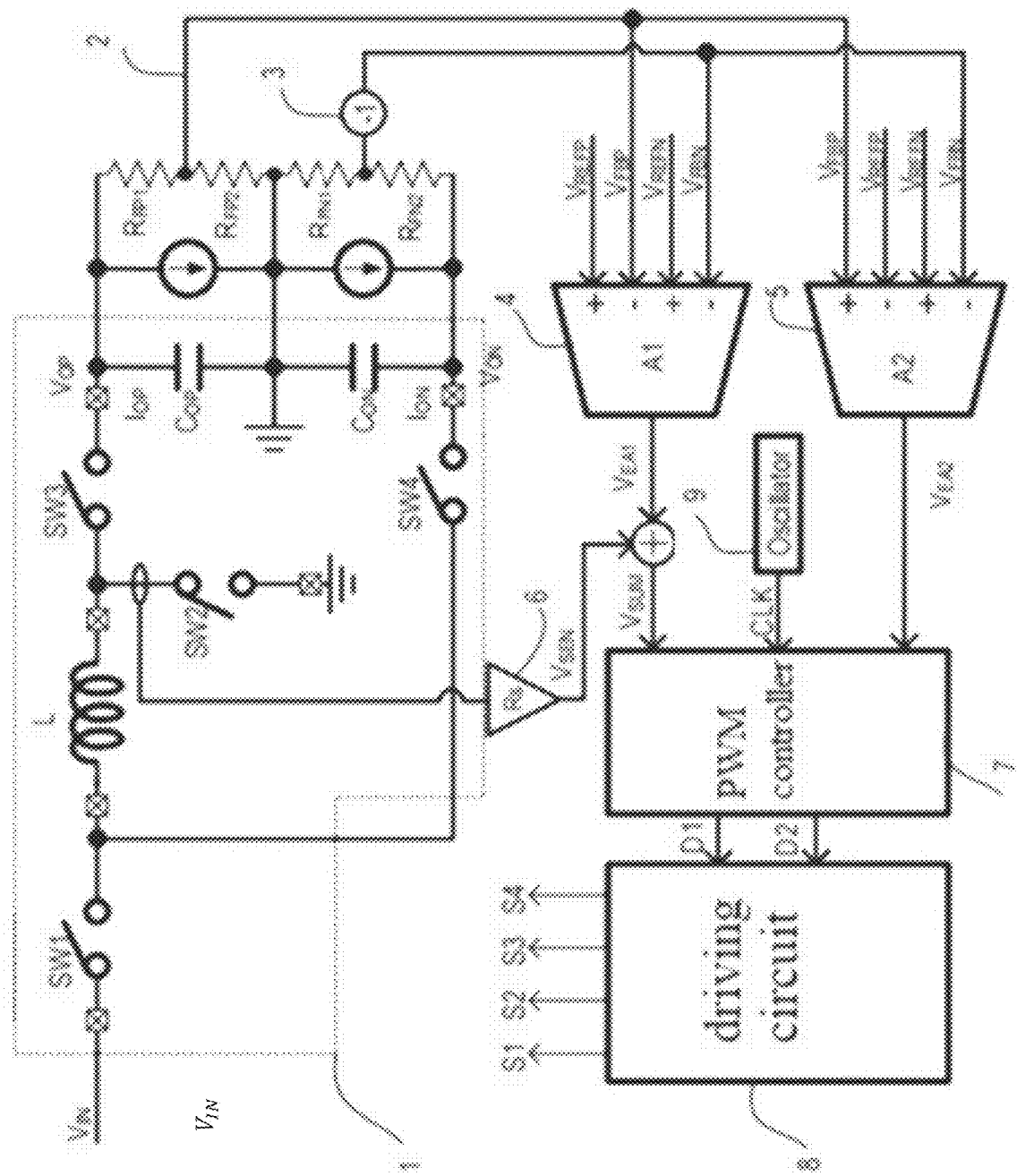
FIG. 3 is a circuit schematic structure diagram of the DC converter in an embodiment of the present application.

An embodiment of the present application provides a DC converter. Referring to FIG. 3, the DC converter includes a DC conversion circuit 1, in which the DC conversion circuit 1 includes a first switch SW1, a second switch SW2, a third switch SW3 and a fourth switch SW4, and further includes an inductor L, a positive voltage output capacitor COP and a negative voltage output capacitor CON. Specifically, a first end of the first switch SW1 is connected to an input voltage VIN, a second end of the first switch SW1 is connected to a first end of the inductor L, a second end of the inductor L is connected to a first end of the third switch SW3, a second end of the third switch SW3 is connected to a first end of the positive voltage output capacitor COP, a second end of the positive voltage output capacitor COP is connected to a first end of the negative voltage output capacitor CON, the first end of the negative voltage output capacitor CON is connected to the first end of the inductor L through the fourth switch SW4, the second end of the positive voltage output capacitor COP and the first end of the negative voltage output capacitor CON are grounded together; a second end of the second switch SW2 is grounded, a first end of the second switch SW2 is connected to the second end of the inductor L; a load is connected between the first end of the positive voltage output capacitor COP and a second end of the negative voltage output capacitor CON.

Furthermore, due to a first terminal voltage VOP of the positive voltage output capacitor COP and a second terminal voltage VON of the negative voltage output capacitor CON, which is not convenient for sampling. Therefore, a first positive voltage divider resistor RFP1 and a second positive voltage divider resistor RFP2 are further connected in series between the first and second ends of the positive voltage output capacitor COP, a first end of the first positive voltage divider resistor RFP1 is connected to the first end of the positive voltage output capacitor COP, and a second end of the second positive voltage divider resistor RFP2 is connected to the second end of the positive voltage output capacitor COP, a second end of the first positive voltage divider resistor RFP1 is connected to a first end of the positive voltage divider resistor RFP2, a first negative voltage divider resistor RFN1 and a second negative voltage divider resistor RFN2 are connected in series between the first and second ends of the negative voltage output capacitor CON, a first end of the first negative voltage divider resistor RFN1 is connected to the first end of the negative voltage output capacitor CON, a second end of the second negative voltage divider resistor RFN2 is connected to the second end of the negative voltage output capacitor CON, and a second end of the first negative voltage divider resistor RFN1 is connected to a first end of the second negative voltage divider resistor RFN2.

Further, referring to FIG. 3, the DC converter further includes a PWM controller 7 and a driving circuit 8.

Specifically, an output end of the PWM controller 7 is connected to an input end of the driving circuit 8, which can receive a D1 pulse signal and D2 pulse signal output by the PWM controller 7. Specifically, the driving circuit 8 receives the D1 pulse signal to output S1 signal or S4 signal, while the driving circuit 8 receives the D2 pulse signal to output S2 signal or S3 signal, wherein the S1 signal is configured to control the first switch SW1 to turn on, the S4 signal is configured to control the fourth switch SW4 to turn on, wherein the S2 signal is configured to control the second switch SW2 to turn on, and the S3 signal is configured to control the third switch SW3 to turn on.

Figure 4:
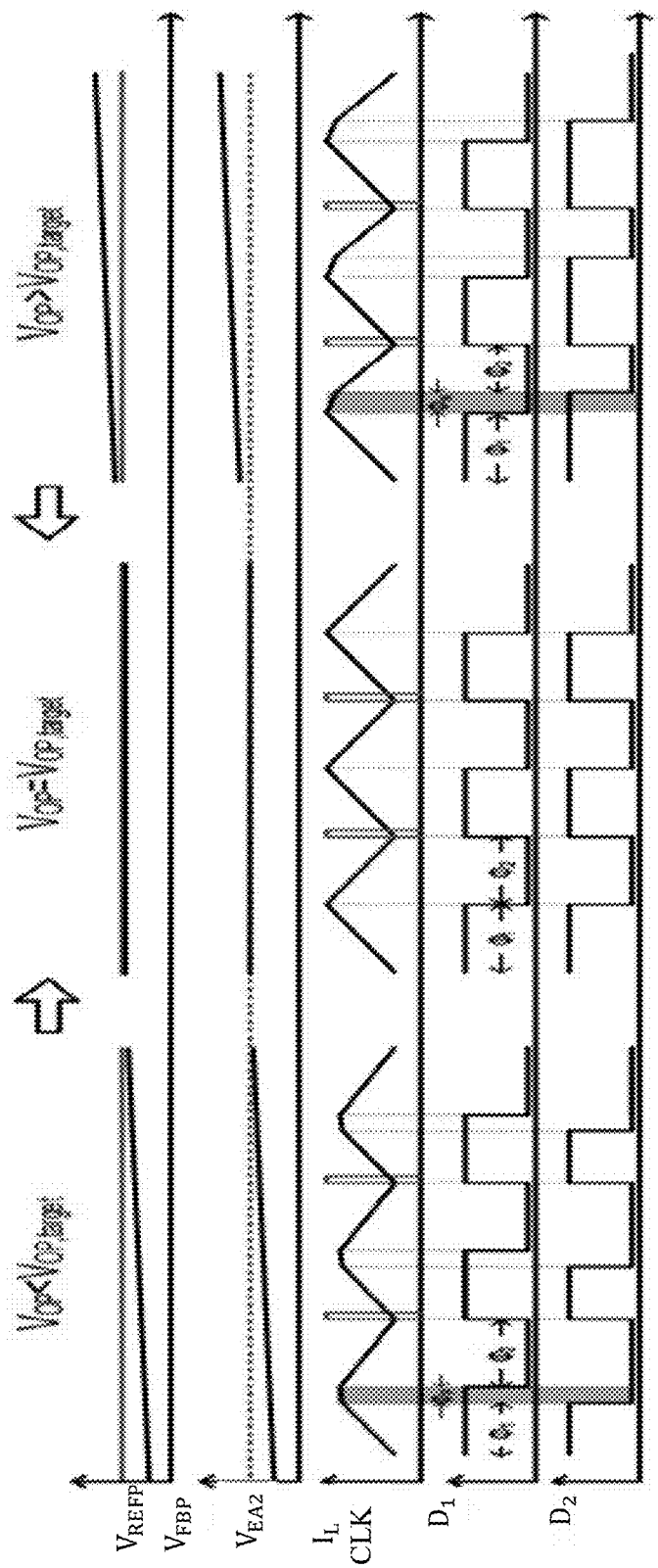
FIG. 4 is a timing diagram of an output signal of a PWM controller in an embodiment of the present application.

Specifically, referring to FIG. 4, when the D1 pulse signal is at a high level, the driving circuit 8 outputs the S1 signal, when the D1 pulse signal is at a low level, the driving circuit 8 outputs the S4 signal. When the D2 pulse signal is at the high level, the driving circuit 8 outputs the S2 signal, when the D2 pulse signal is at the low level, the driving circuit 8 outputs the S3 signal.

The PWM controller 7 is configured so that when it is determined that the first terminal voltage VOP of the positive voltage output capacitor COP is equal to a first target voltage VM1 and a positive voltage output current IOP is equal to a negative voltage output current ION, the PWM controller 7 alternately outputs a first state signal and a second state signal every preset cycle, the first state signal is configured to control the first switch SW1 and the second switch SW2 to turn on synchronously, and control the third switch SW3 and the fourth switch SW4 to turn off synchronously; the second state signal is configured to control the first switch SW1 and the second switch SW2 to turn off synchronously, and control the third switch SW3 and the fourth switch SW4 to turn on synchronously. Wherein, the first target voltage VM1 is a working voltage that the positive voltage output capacitor COP should reach, the positive voltage output current IOP is an output current at the first end of the positive voltage output capacitor COP, and the negative voltage output current ION is the output current at the second end of the negative voltage output capacitor CON.

The PWM controller 7 is further configured so that when it is determined that the first terminal voltage VOP of the positive voltage output capacitor COP is less than the first target voltage VM1, or the positive voltage output current IOP is greater than the negative voltage output current ION, the PWM controller 7 outputs a third state signal for controlling the first switch SW1 and the third switch SW3 to turn on, and controlling the second switch SW2 and the fourth switch SW4 to turn off.

The PWM controller 7 is further configured so that when it is determined that the first terminal voltage VOP of the positive voltage output capacitor COP is greater than the first target voltage VM1, or the positive voltage output current IOP is less than the negative voltage output current ION, the PWM controller 7 outputs a fourth state signal for controlling the first switch SW1 and the third switch SW3 to turn off, and controlling the second switch SW2 and the fourth switch SW4 to turn on.

In particular, the voltage VOP at the first end of the positive voltage output capacitor COP is a positive output voltage, and the voltage VON at the second end of the negative voltage output capacitor CON is a negative output voltage. The positive voltage output current IOP is a current flowing through the first end of the positive voltage output capacitor COP, and the negative voltage output current ION is a current flowing through the second end of the negative voltage output capacitor CON.

Figure 5:
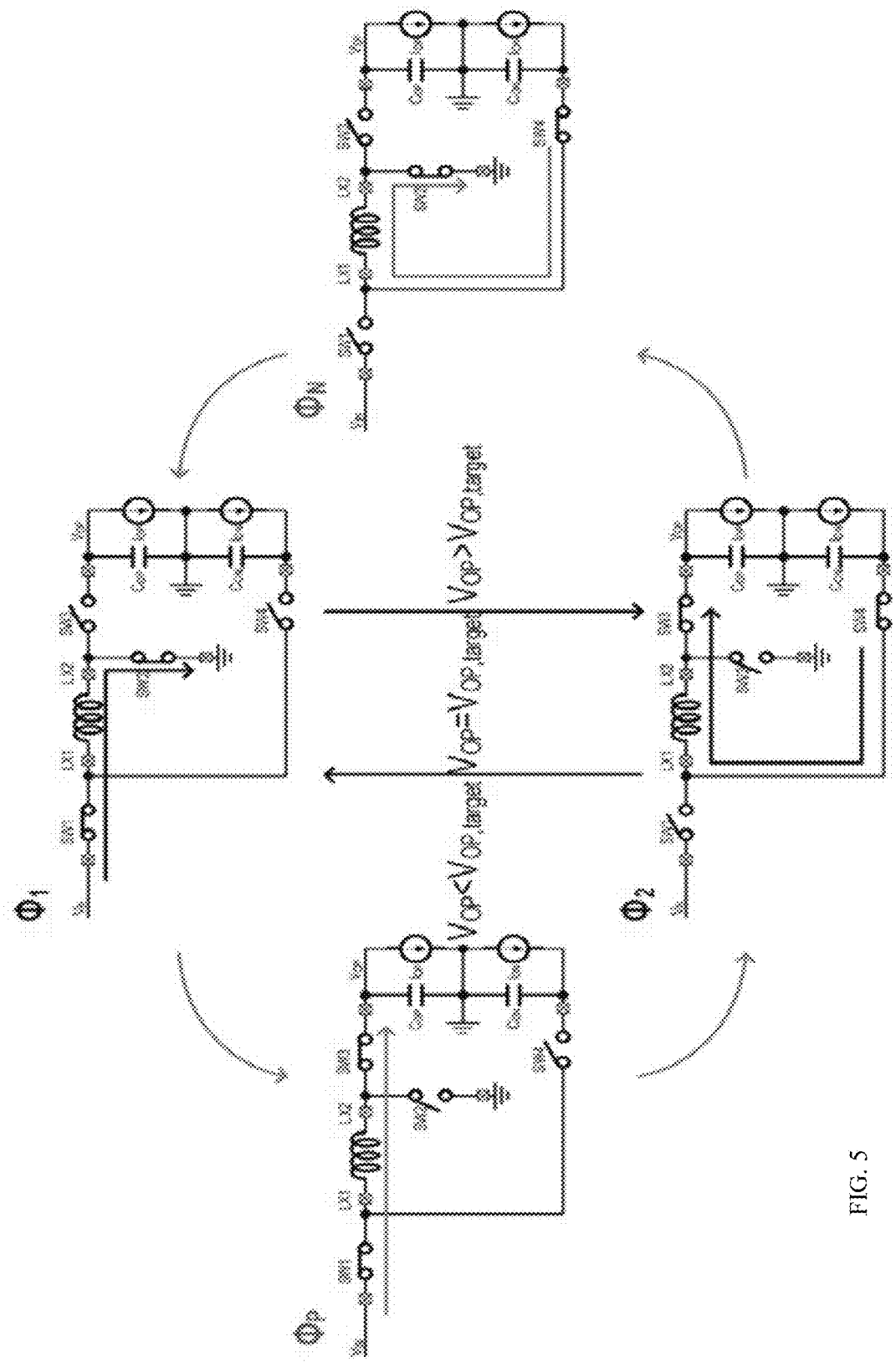
FIG. 5 is a schematic diagram of a DC conversion circuit in different working states in an embodiment of the present application.
Figure 7:
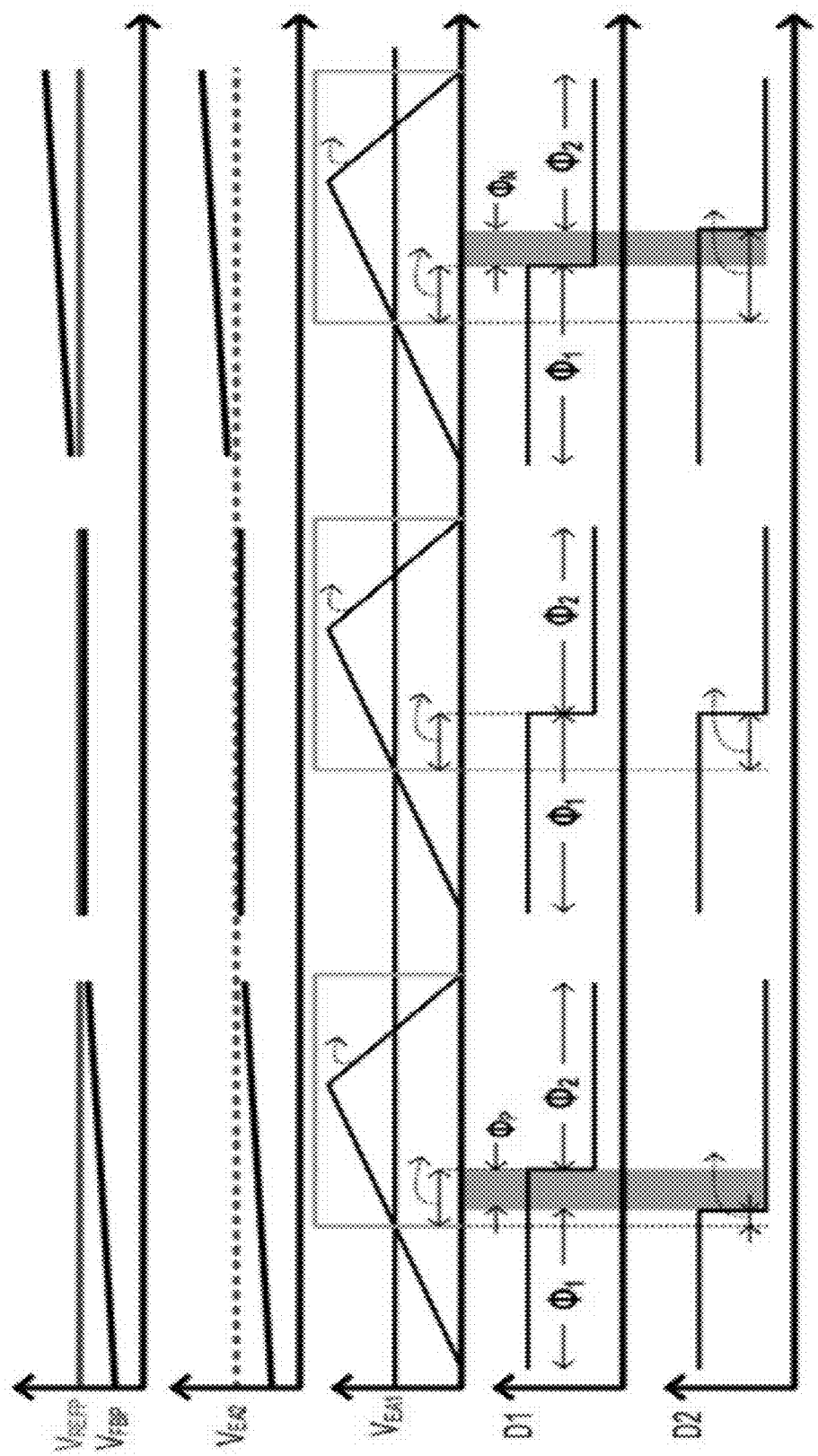
FIG. 7 is a circuit schematic structure diagram for adjusting a pulse width of a D2 pulse signal in an embodiment of the present application.

For the embodiments of the present application, referring to FIGS. 4 and 5, for convenience of explanation, the DC conversion circuit 1 is divided into four states. In particular, the first state signal causes the DC conversion circuit 1 to enter a Φ1 state, and the second state signal causes the DC conversion circuit 1 to enter a Φ2 state; the third state signal causes DC conversion circuit 1 to enter a ΦP state, and the fourth state signal causes DC conversion circuit 1 to enter a ΦN state.

Specifically, referring to FIGS. 4 and 5, the first state signal is a continuous and equal high-level D1 pulse signal and high-level D2 pulse signal, the second state signal is a continuous and equal low-level D1 pulse signal and continuous low-level D2 pulse signal, the third state signal is a continuous high-level D1 pulse signal and low-level D2 pulse signal, and the fourth state signal is a continuous low-level D1 pulse signal and high-level D2 pulse signal.

Specifically, the first state signal is the continuous high-level D1 pulse signal and a continuous high-level D2 pulse signal, the second state signal is the continuous low-level D1 pulse signal and the continuous low-level D2 pulse signal. In the Φ1 and Φ2 states, a pulse width of D1 pulse signal and D2 pulse signal is a same, that is, both D1 pulse signal and D2 pulse signal rise to the high level and fall to the low level at the same time, that is, the D1 pulse signal and the D2 pulse signal are exactly the same two signals. Wherein, the DC converter further includes a clock circuit 9, which is connected to an input end of the PWM controller 7, the clock circuit 9 provides a CLK clock signal to the PWM controller 7 to control the pulse width of the D1 pulse signal and the D2 pulse signal in the first state signal and the second state signal.

The third state signal is the continuous high-level D1 pulse signal and the continuous low-level D2 pulse signal. In particular, in the ΦP state, the pulse width of the D1 pulse signal is the same as the pulse width of the D1 pulse signal output in both the Φ1 and Φ2 states, a low-level pulse width of the D2 pulse signal increases, a high-level pulse width of the D2 pulse signal decreases. That is to say, in the ΦP state, a period of the D1 pulse signal and the D2 pulse signal is the same, and a time when the D1 pulse signal and the D2 pulse signal rise to the high level is the same, within one cycle, a working hour of the D2 pulse signal at the high level is less than that at the low level.

The fourth state signal is the continuous low-level D1 pulse signal and the continuous high-level D2 pulse signal, wherein, the period of the D1 pulse signal and the D2 pulse signal is the same, and the time rise to the high level is the same, at the same time, a duration of the D1 pulse signal at the high level is less than that of the D2 pulse signal at the high level, and a duration of the D2 pulse signal at the low level is less than that of the D1 pulse signal at the low level.

Further, referring to FIG. 3, the DC converter further includes a positive sampling circuit 2, a negative sampling circuit 3, and an intermediate sampling circuit 6. In particular, the positive sampling circuit 2 collects a second terminal voltage VFBP of the first positive voltage divider resistor RFP1; the negative sampling circuit 3 collects the second terminal voltage of the first negative voltage divider resistor RFN1 and converts it into a positive voltage to obtain a voltage VFBN; and the intermediate sampling circuit 6 collects a current at the first end of the second switch SW2 and converts it into a VSEN voltage signal.

Further, the DC converter further includes a first amplification module 4 and a second amplification module 5. In particular, the first amplification module 4 adds an error between the second terminal voltage VFBP of the first positive voltage divider resistor RFP1 and a first reference voltage VREFP to an error between the voltage VFBN and a second reference voltage VREFN, and outputs a sum in a gain manner to obtain a first sampling voltage VEA1, wherein VFBP=RFP2*VM1/(RFP1+RFP2), a second target voltage VM2 is a target voltage at the second end of the negative voltage output capacitor CON, VREFN=RFN2*VM2/(RFN1+RFN2), VEA1=A1 (VFBP VREFP)+A1 (VFBN VREFN), where A1 is a gain of the first amplification module 4. After adding the first sampling voltage VEA1 and a VSEN voltage obtained from the intermediate sampling circuit 6, it is input into the input end of the PWM controller 7 to control the PWM controller 7 to output a continuous D1 pulse signal.

The second amplification module 5 subtracts the error between the second terminal voltage VFBP of the first positive voltage divider resistor RFP1 and the first reference voltage VREFP by the error between the voltage VFBN and the second reference voltage VREFN, and outputs a difference in a gain manner to obtain a second sampling voltage VEA2, the second sampling voltage VEA2 is A2 (VFBP–VREFP)–A2 (VFBN-VREFN), where A2 is a gain of the second amplification module 5.

The second sampling voltage VEA2 is input to the input end of the PWM controller 7 to control an output of the D2 pulse signal by PWM controller 7. When the second sampling voltage VEA2 is greater than a corresponding stable voltage, the PWM controller 7 outputs the D2 pulse signal with the pulse width greater than the D1 pulse signal; when the second sampling voltage VEA2 is less than the corresponding stable voltage, the PWM controller 7 outputs the D2 pulse signal with the pulse width less than the D1 pulse signal; when the VEA2 is equal to the corresponding stable voltage, the PWM controller 7 outputs the D1 pulse signal and the D2 pulse signal with an equal pulse width, when the first terminal voltage VOP of the positive voltage output capacitor COP is equal to the first target voltage VM1, the second sampling voltage VEA2 is equal to the corresponding stable voltage. A horizontal dashed line in FIG. 4 represents the stable voltage corresponding to VEA2 voltage.

An output voltage VEA1 of the first amplification module 4 is added to an output voltage VSEN of the intermediate sampling circuit 6 to output the input end of the PWM controller 7, so as to control the D1 pulse signal output of the PWM controller 7. An output voltage VEA2 of the second amplification module 5 is input to the input end of the PWM controller 7 to control the output of the D2 pulse signal by the PWM controller 7.

The following content specifically explains a working principle of the DC conversion circuit 1 when the positive voltage output current IOP is equal to the negative voltage output current ION:

Referring to FIGS. 4 and 5, the first target voltage VM1 is the working voltage that the positive voltage output capacitor COP should reach. When the voltage VOP is equal to the first target voltage VM1, VFBN is equal to VREFP. When in the Φ1 state, the switch SW1 and the switch SW2 are turned on, the switch SW3 and the switch SW4 are turned off, at this time, a first end on a left side of the inductor L is connected to the input voltage VIN, and the second end of the inductor L is grounded, the voltage difference between the two ends of the inductor L is greater than 0, the current of the inductor L increases, the inductor L is magnetized, and the current flows from the input end to a ground end, the current of the inductor L increases, and both an amplitude of a positive output voltage VOP and a negative output voltage VON decrease.

When in the Φ2 state, the switch SW1 and the switch SW2 are turned off, the switch SW3 and the switch SW4 are turned on, at this time, the first end of the inductor L is connected to the second end of the negative voltage output capacitor CON, and the second end of the inductor L is connected to the first end of the positive voltage output capacitor COP. That is to say, the first end of the inductor L is the voltage VON, and the second end of the inductor L is the voltage VOP, the voltage difference between the two ends of the inductor L is less than 0, and the current of the inductor L decreases, the inductor L is demagnetized, and the current flows from a negative output VON to a positive output VOP. The current of the inductor L decreases, and both the positive output voltage VOP and the negative output voltage VON increase.

When the load is connected between the positive voltage output capacitor COP and the negative voltage output capacitor CON and the voltage VOP is equal to the first target voltage VM1, the PWM controller 7 continuously outputs the D1 pulse signal and the D2 pulse signal with the equal pulse width, and the D1 pulse signal and D2 pulse signal are exactly the same.

The DC conversion circuit 1 works alternatively between two states, that is, Φ1 and Φ2, to simultaneously convert the input voltage VIN into the positive output voltage VOP and the negative output voltage VON.

Aolt-second balance is performed on the inductor L to give D(VIN−0)=(1−D)(VOP−VON), (VOP−VON)/VIN=D/(1−D), where VIN is the input voltage, VOP is the positive output voltage, VON is the negative output voltage, D is a proportion of working time of Φ1 within one cycle, D∈(0, 1), and (VOP−VON)/VIN∈(0, ∞). Therefore, theoretically VOP and VON can be any positive voltage or negative voltage.

During a process of generating a stable positive voltage output VOP and a stable negative voltage output VON in the DC conversion circuit 1, the ΦP state or ΦN state can be added according to the state of VOP or VON.

Referring to FIGS. 4 and 5, specifically, in the ΦP state, the switch SW1 and the switch SW3 are turned on, the switch SW2 and the switch W4 are turned off, and at this time, the current flows from the input end on the left side of the inductor L to the first end of the positive voltage output capacitor COP through the inductor L, while no current flows out from the second end of the negative voltage output capacitor CON; therefore, the positive output voltage VOP will increase, and the negative output voltage VON will decrease.

When the voltage VOP at the first end of the positive voltage output capacitor COP is less than the first target voltage VM1, the voltage VOP is less than the voltage VREFP. In order to increase the voltage VOP, more current needs to flow to the first end of the positive voltage output capacitor COP, therefore, at this time, the DC conversion circuit 1 will be added with the ΦP state, causing the positive output voltage VOP to rise. When the voltage VOP is equal to the first target voltage VM1, the ΦP state is removed and the circuit returns to a state where Φ1 state and Φ2 state alternate. At this time, the PWM controller 7 outputs the D1 pulse signal and the D2 pulse signal, and the D1 pulse signal remains unchanged compared to the D1 pulse signal in the Φ1 state; the D2 pulse signal relative to the D1 pulse signal. Within each cycle, the D2 pulse signal has a shorter working time at the high level and a longer working time at the low level, but a period of the D2 pulse signal is still the same as that of the D1 pulse signal, that is, having the same pulse width.

Specifically, in the ΦN state, the switch SW2 and the switch SW4 are turned on, the switch SW2 and the switch SW3 are turned off, and at this time, the current flows from VON to the ground end through the inductor L, while no current flows into the first end of the positive voltage output capacitor COP, the positive output voltage VOP will decrease, and the negative output voltage VON will increase.

When the positive output voltage VOP is greater than the first target voltage VM1, VFBP>VREFP, that is, when the positive output voltage VOP is higher than the target voltage VM1, it means that there is no need for the current to flow to the first end of the positive voltage output capacitor COP at this time, therefore, the circuit will be added with the ΦN state, causing VOP to decrease. Until the positive output voltage VOP=VM1, the ΦN state will be removed, and the circuit will return to a state where Φ1 state and Φ2 state alternate. At this time, the PWM controller 7 outputs the D1 pulse signal and the D2 pulse signal, and the D1 pulse signal remains unchanged compared to the D1 pulse signal in the Φ1 state; the D2 pulse signal relative to the D1 pulse signal, within each cycle, the D2 pulse signal has a shorter working time at the low level and a longer working time at the high level, but the period of the D2 pulse signal is still the same as that of the D1 pulse signal, that is, having the same pulse width.

The following content specifically explains the working principle of the DC conversion circuit 1 when the positive voltage output current IOP is not equal to the negative voltage output current ION:

when the positive voltage output current IOP is greater than the negative voltage output current ION, the positive output voltage VOP is greater than the negative output voltage VON. Generally, the operating condition of the DC converter, that is a working requirement of the load, is that the positive output voltage VOP should be greater than or equal to the negative output voltage VON. Therefore, at this time, it is necessary to increase the positive output voltage and reduce the negative output voltage. At this time, the DC conversion circuit 1 changes from a stable state where the Φ1 state and Φ2 state alternate to a state where the ΦP state is added between the Φ1 state and Φ2 state, causing the positive output voltage VOP to increase and the negative output voltage VON to decrease.

When the positive voltage output current IOP is less than the negative voltage output current ION, the positive output voltage VOP is less than the negative output voltage VON, at this time, the positive output voltage should be reduced and the negative output voltage should be increased. At this point, the DC conversion circuit 1 changes from the stable state where the Φ1 state and Φ2 state alternate to a state where the ΦN state is added between the Φ1 state and Φ2 state, causing a decrease in the positive output voltage VOP and an increase in the negative output voltage VON.

In an embodiment of the present application, when the DC conversion circuit 1 is in a stable operation, that is, when the positive output voltage VOP is equal to the first target voltage VM1, and the positive voltage output current IOP is equal to the negative voltage output current ION, the DC conversion circuit 1 only has two states: the Φ1 state and Φ2 state, at this time, the D1 pulse signal and the D2 pulse signal are exactly the same, and both the D1 pulse signal and the D2 pulse signal have only two phases. In a process of regulating the positive output voltage VOP and/or the negative output voltage VON, voltage regulation states of the ΦP state and the ΦN state are introduced. Theoretically, both the positive output voltage VOP and the negative output voltage VON can be any voltage value. Comparing with related technologies, the positive output voltage of the DC converter in an embodiment of the present application can be smaller than the input voltage VIN, thereby achieving a wide range of positive output voltage output.

Further, the DC conversion circuit 1 in an embodiment of the present application is not sensitive to a difference in a load current between the positive and negative ends. Theoretically, the circuit can operate stably under non no-load conditions between the positive voltage output capacitor COP and the negative voltage output capacitor CON. Furthermore, the solution of the embodiment of the present application only requires an amplifier with compensation to achieve functions of the first amplification module 4 and the second amplification module 5, reducing uses of passive compensation devices such as resistors and capacitors.

Due to the presence of the ΦP state and ΦN state, it is possible to adjust the positive output voltage VOP and negative output voltage VON, while in related technologies, an adjustment of the positive output voltage VOP and negative output voltage VON usually requires the slope compensation circuit. Therefore, a circuit structure of the DC converter in the present application further reduces an application of the slope compensation circuit.

The embodiment of the present application provides a control method of the PWM controller which is applied to the circuit structure of the DC converter in the embodiment mentioned above; specifically, referring to FIGs, a PWM control method includes:

step S61. when it is determined that a first terminal voltage VOP of a positive voltage output capacitor COP is equal to a first target voltage VM1 and a positive voltage output current IOP is equal to a negative voltage output current ION, a PWM controller alternately outputs a first state signal and a second state signal every preset cycle, the first state signal is configured to control a first switch SW1 and a second switch SW2 to turn on synchronously, and control a third switch SW3 and a fourth switch SW4 to turn off synchronously; the second state signal is configured to control the first switch SW1 and the second switch SW2 to turn off synchronously, and control the third switch SW3 and the fourth switch SW4 to turn on synchronously, where the first target voltage VM1 is a working voltage that the positive voltage output capacitor COP should reach;

step S62. when it is determined that the first terminal voltage VOP of the positive voltage output capacitor COP is less than the first target voltage VM1, or the positive voltage output current IOP is greater than the negative voltage output current ION, the PWM controller outputs a third state signal for controlling the first switch SW1 and the third switch SW3 to turn on, and controlling the second switch SW2 and the fourth switch SW4 to turn off, step S63. when it is determined that the first terminal voltage VOP of the positive voltage output capacitor COP is greater than the first target voltage VM1, or the positive voltage output current IOP is less than the negative voltage output current ION, the PWM controller outputs a fourth state signal for controlling the first switch SW1 and the third switch SW3 to turn off, and controlling the second switch SW2 and the fourth switch SW4 to turn on.

In the control method, the PWM controller will generate a D1 pulse signal according to a VEA1 voltage output by an amplifier with compensation, to modulate a difference VOP−VON between the positive output voltage VOP and the negative output voltage VON, so that VOP−VON=VM1−VM2. The PWM controller will generate a D2 pulse signal with the pulse width greater than/equal to/less than the D1 pulse signal according to an output VEA2 of the amplifier, the positive voltage output VOP and negative voltage output VON are modulated to their respective target voltage values, so that the positive output voltage VOP of the DC conversion circuit 1 is equal to the first target voltage VM1, and the negative output voltage VON is equal to a second target voltage VM2.

Further, whenever the positive output voltage VOP and negative output voltage VON are stable, a power stage circuit, that is, a DC conversion circuit 1, only operates as a single inductor L-bipolar output DC-DC converter in two phases. The control method of the PWM controller provided in an embodiment of the present application is applicable not only based on a method in which the positive output current and negative output current adjust the positive output voltage and negative output voltage applicable, but also based on a method in which a relationship between the positive output voltage and the target voltage is used for adjusting the positive output voltage and negative output voltage.

Figure 8:
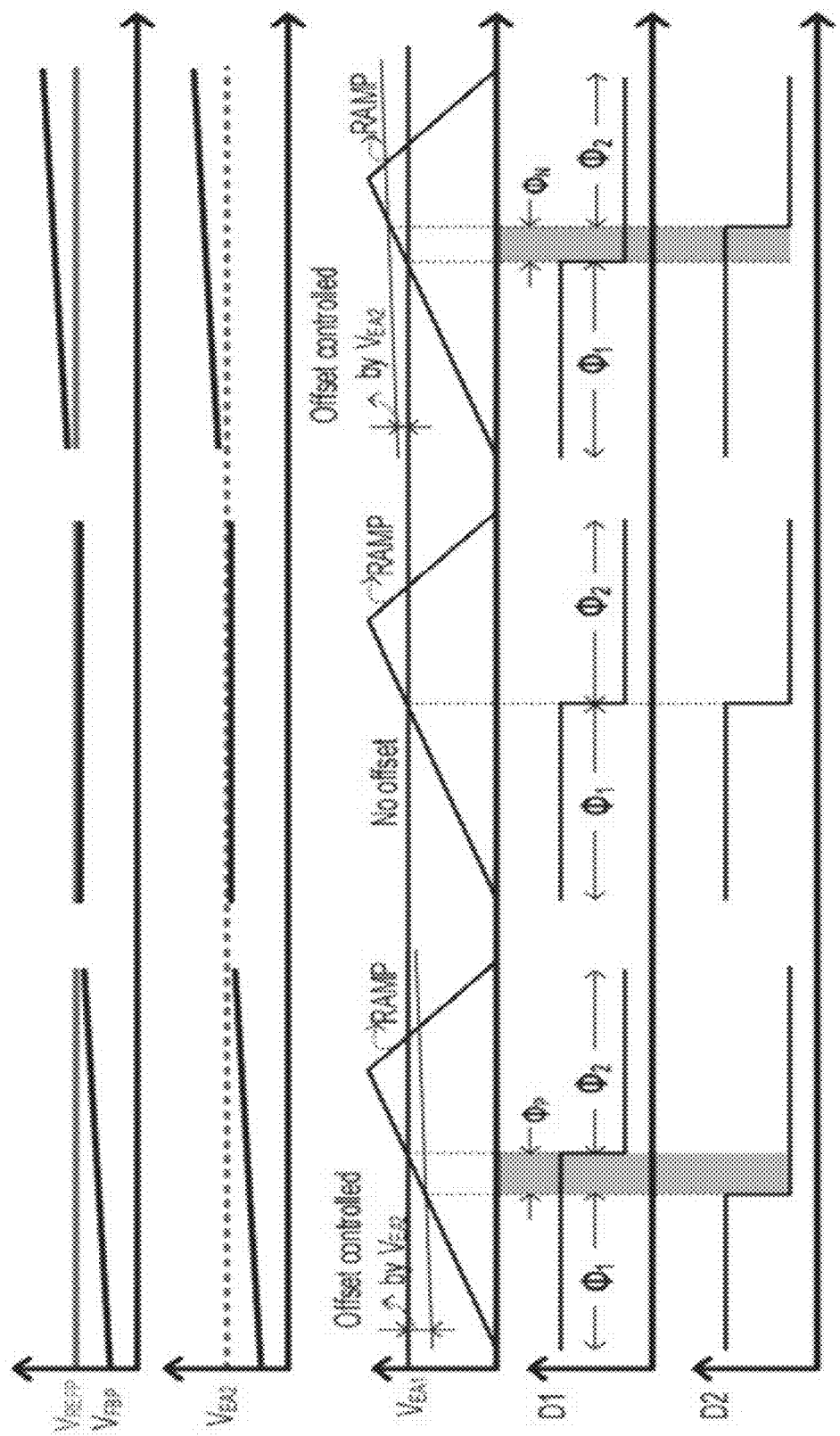
FIG. 8 is a circuit that adjusts the pulse width of the D2 pulse signal based on VEA2 voltage in an embodiment of the present application.
Figure 9:
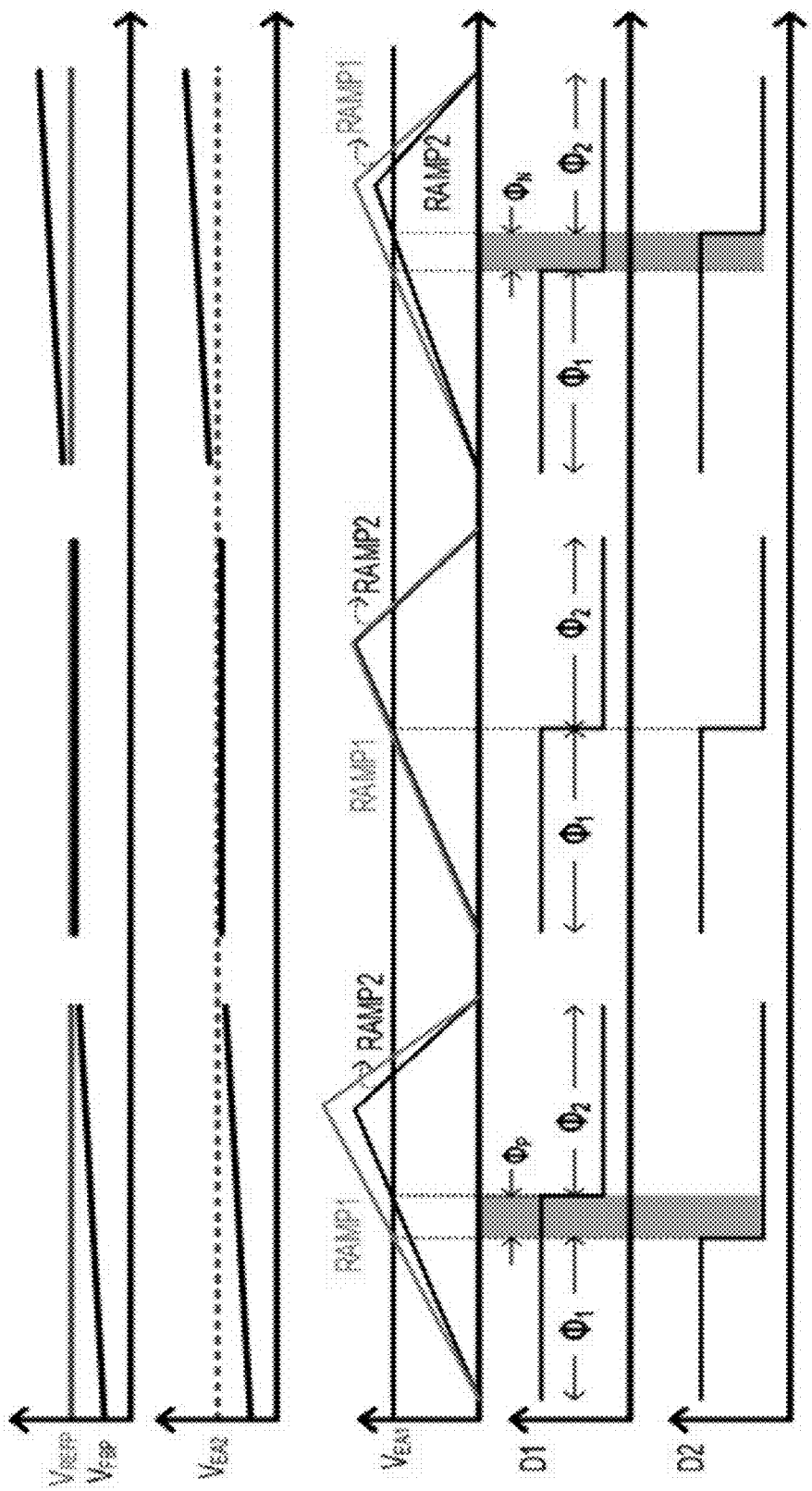
FIG. 9 is another circuit that adjusts the pulse width of the D2 pulse signal based on VEA2 voltage in an embodiment of the present application.

Further, the circuit that adjusts the pulse width of the D2 pulse signal based on the output voltage VEA2 of the second amplification module 5 includes, but not limited to: a circuit that generates different delays based on different voltages VEA2, as shown in the figures; a circuit that generates voltages with different offsets from a reference voltage VEA1 according to different voltages VEA2, and then compares them with a same slope, as shown in FIG. 8; a circuit that adjusts a height of a slope circuit according to different voltages VEA2, and then compares a same VEA1 signal with slope signals of different heights, as shown in FIG. 9, etc.

It should be understood that although various steps in the flowchart in the accompanying drawings are showed sequentially according to arrows, these steps are not necessarily executed in an order indicated by the arrows. Unless explicitly stated in this article, the execution of these steps does not have strict order restrictions and can be carried out in other orders. Moreover, at least a part of the steps in the flowchart of the accompanying drawings may include multiple substeps or stages, which may not necessarily be completed at the same time, but may be executed at different times, and their execution order may not necessarily be sequential, but may rotate or alternate with at least a part of other steps or other substeps or stages.

The above are only partial embodiments of the present application, it should be pointed out that for those skilled in the art, several improvements and embellishments can be made without departing from the principles of the present application, these improvements and embellishments should also be considered as the scope of protection of the present application.

List of reference signs: 1. DC conversion circuit; 2. positive sampling circuit; 3. negative sampling circuit; 4. first amplification module; 5. second amplification module; 6. intermediate sampling circuit; 7. PWM controller; 8. driving circuit; 9. clock circuit.

What is claimed is:

1. A direct current (DC) converter, comprising a DC conversion circuit, a pulse width modulation (PWM) controller, and a driving circuit, wherein the DC conversion circuit comprises a first switch, a second switch, a third switch, a fourth switch, an inductor, a positive voltage output capacitor and a negative voltage output capacitor, a first end of the first switch is connected to an input voltage, a second end of the first switch is connected to a first end of the inductor, a second end of the inductor is connected to a first end of the third switch, a second end of the third switch is connected to a first end of the positive voltage output capacitor, a second end of the positive voltage output capacitor is connected to a first end of the negative voltage output capacitor, a second end of the negative voltage output capacitor is connected to the first end of the inductor through the fourth switch, the second end of the positive voltage output capacitor and the first end of the negative voltage output capacitor are grounded together, a second end of the second switch is grounded, a first end of the second switch is connected to the second end of the inductor, a load is connected between the first end of the positive voltage output capacitor and the second end of the negative voltage output capacitor;

the PWM controller is configured to alternately output a first state signal and a second state signal every preset cycle when it is determined that a first terminal voltage of the positive voltage output capacitor is equal to a first target voltage and a positive voltage output current is equal to a negative voltage output current, the first state signal is configured to control the first switch and the second switch to turn on synchronously and control the third switch and the fourth switch to turn off synchronously, the second state signal is configured to control the first switch and the second switch to turn off synchronously and control the third switch and the fourth switch to turn on synchronously, and the first target voltage is a working voltage to be reached by the positive voltage output capacitor;

the PWM controller is further configured to output a third state signal for controlling the first switch and the third switch to turn on and controlling the second switch and the fourth switch to turn off when it is determined that the first terminal voltage of the positive voltage output capacitor is less than the first target voltage or the positive voltage output current is greater than the negative voltage output current, the PWM controller is further configured to output a fourth state signal for controlling the first switch and the third switch to turn off and controlling the second switch and the fourth switch to turn on when it is determined that the first terminal voltage of the positive voltage output capacitor is greater than the first target voltage or the positive voltage output current is less than the negative voltage output current, wherein an output end of the PWM controller is connected to an input end of the driving circuit, the driving circuit is configured to receive a first pulse signal and a second pulse signal output by the PWM controller;

wherein the driving circuit receives the first pulse signal to output a first signal or a second signal, the driving circuit receives the second pulse signal to output a third signal or a fourth signal, the first signal is configured to control the first switch to turn on, the second signal is configured to control the fourth switch to turn on, the third signal is configured to control the second switch to turn on, and the fourth signal is configured to control the third switch to turn on;

wherein, when the first pulse signal is at a high level, the driving circuit outputs the first signal, when the first pulse signal is at a low level, the driving circuit outputs the second signal, when the second pulse signal is at the high level, the driving circuit outputs the third signal, and when the second pulse signal is at the low level, the driving circuit outputs the fourth signal;

wherein the first state signal is a continuous and equal high-level first pulse signal and high-level second pulse signal, the second state signal is a continuous and equal low-level first pulse signal and continuous low-level second pulse signal, the third state signal is a continuous high-level first pulse signal and low-level second pulse signal, and the fourth state signal is a continuous low-level first pulse signal and high-level second pulse signal, wherein a first positive voltage divider resistor and a second positive voltage divider resistor are connected in series between the first end and the second end of the positive voltage output capacitor, a first end of the first positive voltage divider resistor is connected to the first end of the positive voltage output capacitor, a second end of the second positive voltage divider resistor is connected to the second end of the positive voltage output capacitor, a second end of the first positive voltage divider resistor is connected to a first end of the second positive voltage divider resistor, a first negative voltage divider resistor and a second negative voltage divider resistor are connected in series between the first end and the second end of the negative voltage output capacitor, a first end of the first negative voltage divider resistor is connected to the first end of the negative voltage output capacitor, a second end of the second negative voltage divider resistor is connected to the second end of the negative voltage output capacitor, a second end of the first negative voltage divider resistor is connected to a first end of the second negative voltage divider resistor, and the DC converter further comprises a positive sampling circuit, a negative sampling circuit, and an intermediate sampling circuit;

the positive sampling circuit is configured to collect a second terminal voltage of the first positive voltage divider resistor;

the negative sampling circuit is configured to collect a second terminal voltage of the first negative voltage divider resistor and convert the second terminal voltage of the first negative voltage divider resistor into a positive voltage to obtain a voltage;

the intermediate sampling circuit is configured to collect a current at the first end of the second switch and convert the current into a voltage signal; and the DC converter further comprises a clock circuit, the clock circuit is configured to generate a clock signal and input the clock signal to an input end of the PWM controller, the first pulse signal and the second pulse signal outputted by the PWM controller are continuous and identical based on the clock signal, wherein pulse widths of the first pulse signal and the second pulse signal are preset periods.

2. The DC converter according to claim 1, further comprising a first amplification module and a second amplification module;

wherein the first amplification module adds an error between the second terminal voltage of the first positive voltage divider resistor and a first reference voltage to an error between the voltage and a second reference voltage, and outputs a sum in a gain manner to obtain a first sampling voltage, wherein $VFBP=RFP2*VM1/(RFP1+RFP2)$, a second target voltage is a target voltage at the second end of the negative voltage output capacitor, $VREFN=RFN2*VM2/(RFN1+RFN2)$, $VEA1=A1(VFBP-VREFP)+A1(VFBN-VREFN)$, where A1 is a gain of the first amplification module, VFBP is the second terminal voltage, RFP2 is a resistance of the second positive voltage divider resistor, VM1 is the first target voltage, RFP1 is a resistance of the first positive voltage divider resistor, VREFN is the second reference voltage, RFN2 is a resistance of the second negative voltage divider resistor, VM2 is the second target voltage, RFN1 is a resistance of the first negative voltage divider resistor, VEA1 is the first sampling voltage, VREFP is the first reference voltage, and VFBN is the voltage;

after adding the first sampling voltage to a voltage obtained from the intermediate sampling circuit, a sum is input into the input end of the PWM controller to control the PWM controller to output the continuous first pulse signal;

the second amplification module subtracts the error between the second terminal voltage of the first positive voltage divider resistor and the first reference voltage by the error between the voltage and the second reference voltage, and outputs a difference in a gain manner to obtain a second sampling voltage, and the second sampling voltage is A2(VFBP−VREFP)−A2(VFBN−VREFN), where A2 is a gain of the second amplification module; and the second sampling voltage is input to the input end of the PWM controller to control an output of the second pulse signal by the PWM controller, when the second sampling voltage is greater than a corresponding stable voltage, the PWM controller outputs the second pulse signal with the pulse width greater than the first pulse signal, when the second sampling voltage is less than the corresponding stable voltage, the PWM controller outputs the second pulse signal with the pulse width less than the first pulse signal, when the second sampling voltage is equal to the corresponding stable voltage, the PWM controller outputs the first pulse signal and the second pulse signal with an equal pulse width, and when the first terminal voltage of the positive voltage output capacitor is equal to the first target voltage, the second sampling voltage is equal to the corresponding stable voltage.

3. A direct current (DC) converter, comprising a DC conversion circuit and a pulse width modulation (PWM) controller, wherein the DC conversion circuit comprises a first switch, a second switch, a third switch, a fourth switch, an inductor, a positive voltage output capacitor and a negative voltage output capacitor, a first end of the first switch is connected to an input voltage, a second end of the first switch is connected to a first end of the inductor, a second end of the inductor is connected to a first end of the third switch, a second end of the third switch is connected to a first end of the positive voltage output capacitor, a second end of the positive voltage output capacitor is connected to a first end of the negative voltage output capacitor, a second end of the negative voltage output capacitor is connected to the first end of the inductor through the fourth switch, the second end of the positive voltage output capacitor and the first end of the negative voltage output capacitor are grounded together, a second end of the second switch is grounded, a first end of the second switch is connected to the second end of the inductor, a load is connected between the first end of the positive voltage output capacitor and the second end of the negative voltage output capacitor;

the PWM controller is configured to alternately output a first state signal and a second state signal every preset cycle when it is determined that a first terminal voltage of the positive voltage output capacitor is equal to a first target voltage and a positive voltage output current is equal to a negative voltage output current, the first state signal is configured to control the first switch and the second switch to turn on synchronously and control the third switch and the fourth switch to turn off synchronously, the second state signal is configured to control the first switch and the second switch to turn off synchronously and control the third switch and the fourth switch to turn on synchronously, and the first target voltage is a working voltage to be reached by the positive voltage output capacitor;

the PWM controller is further configured to output a third state signal for controlling the first switch and the third switch to turn on and controlling the second switch and the fourth switch to turn off when it is determined that the first terminal voltage of the positive voltage output capacitor is less than the first target voltage or the positive voltage output current is greater than the negative voltage output current, the PWM controller is further configured to output a fourth state signal for controlling the first switch and the third switch to turn off and controlling the second switch and the fourth switch to turn on when it is determined that the first terminal voltage of the positive voltage output capacitor is greater than the first target voltage or the positive voltage output current is less than the negative voltage output current, the direct current (DC) converter further comprising a first amplification module and a second amplification module;

wherein the first amplification module adds an error between a second terminal voltage of a first positive voltage divider resistor and a first reference voltage to an error between a voltage and a second reference voltage, and outputs a sum in a gain manner to obtain a first sampling voltage, wherein VFBP=RFP2*VM1/(RFP1+RFP2), a second target voltage is a target voltage at the second end of the negative voltage output capacitor, VREFN=RFN2*VM2/(RFN1+RFN2), VEA1=A1(VFBP−VREFP)+A1(VFBN−VREFN), where A1 is a gain of the first amplification module, VFBP is the second terminal voltage, RFP2 is a resistance of a second positive voltage divider resistor, VM1 is the first target voltage, RFP1 is a resistance of the first positive voltage divider resistor, VREFN is the second reference voltage, RFN2 is a resistance of a second negative voltage divider resistor, VM2 is the second target voltage, RFN1 is a resistance of a first negative voltage divider resistor, VEA1 is the first sampling voltage, VREFP is the first reference voltage, and VFBN is the voltage;

after adding the first sampling voltage to a voltage obtained from an intermediate sampling circuit, a sum is input into an input end of the PWM controller to control the PWM controller to output a continuous first pulse signal;

the second amplification module subtracts the error between the second terminal voltage of the first positive voltage divider resistor and the first reference voltage by the error between the voltage and the second reference voltage, and outputs a difference in a gain manner to obtain a second sampling voltage, and the second sampling voltage is A2(VFBP−VREFP)−A2(VFBN−VREFN), where A2 is a gain of the second amplification module; and the second sampling voltage is input to the input end of the PWM controller to control an output of a second pulse signal by the PWM controller, when the second sampling voltage is greater than a corresponding stable voltage, the PWM controller outputs the second pulse signal with a pulse width greater than the first pulse signal, when the second sampling voltage is less than the corresponding stable voltage, the PWM controller outputs the second pulse signal with the pulse width less than the first pulse signal, when the second sampling voltage is equal to the corresponding stable voltage, the PWM controller outputs the first pulse signal and the second pulse signal with an equal pulse width, and when the first terminal voltage of the positive voltage output capacitor is equal to the first target voltage, the second sampling voltage is equal to the corresponding stable voltage.

* * * * *